United States Patent
Miyakawa et al.

(10) Patent No.: US 8,362,972 B2
(45) Date of Patent: Jan. 29, 2013

(54) HEAD-MOUNTED DISPLAY

(75) Inventors: Yoshiaki Miyakawa, Koto-ku (JP); Shigeru Kato, Kawasaki (JP)

(73) Assignee: Nikon Corporation, Tokyo (JP)

( * ) Notice: Subject to any disclaimer, the term of this patent is extended or adjusted under 35 U.S.C. 154(b) by 709 days.

(21) Appl. No.: 12/292,145

(22) Filed: Nov. 12, 2008

(65) Prior Publication Data
US 2009/0073083 A1 Mar. 19, 2009

Related U.S. Application Data

(63) Continuation of application No. PCT/JP2007/061482, filed on Jun. 6, 2007.

(30) Foreign Application Priority Data

Jun. 13, 2006 (JP) ................................. 2006-163127

(51) Int. Cl.
G09G 5/00 (2006.01)

(52) U.S. Cl. ..................... 345/8; 345/7; 345/9; 359/630; 359/631; 349/11

(58) Field of Classification Search ................ 345/7–10; 359/630–633; 348/42, 43, 45, 51–54; 381/309–311; 349/11
See application file for complete search history.

(56) References Cited

U.S. PATENT DOCUMENTS

| | | | | | |
|---|---|---|---|---|---|
| 3,632,903 | A | * | 1/1972 | Lange, Jr. ...................... | 381/309 |
| 4,753,514 | A | * | 6/1988 | Kubik ............................ | 359/618 |
| 5,696,831 | A | * | 12/1997 | Inanaga et al. ................ | 381/309 |
| 5,739,797 | A | * | 4/1998 | Karasawa et al. ................ | 345/8 |
| 5,793,865 | A | * | 8/1998 | Leifer ............................ | 379/430 |
| 5,815,126 | A | * | 9/1998 | Fan et al. ......................... | 345/8 |
| 6,034,653 | A | * | 3/2000 | Robertson et al. ................ | 345/8 |
| 6,181,304 | B1 | * | 1/2001 | Robinson et al. ................ | 345/8 |
| 6,301,050 | B1 | * | 10/2001 | DeLeon ........................ | 359/618 |
| 6,683,584 | B2 | * | 1/2004 | Ronzani et al. ................... | 345/8 |
| 7,031,475 | B2 | * | 4/2006 | Kuraoka et al. ................. | 381/74 |
| 7,068,242 | B2 | * | 6/2006 | Kiyokawa ........................ | 345/8 |
| 2002/0076060 | A1 | * | 6/2002 | Hall et al. ....................... | 381/74 |
| 2002/0149545 | A1 | * | 10/2002 | Hanayama et al. ............... | 345/7 |
| 2006/0119539 | A1 | * | 6/2006 | Kato et al. ........................ | 345/8 |
| 2007/0046776 | A1 | * | 3/2007 | Yamaguchi et al. ............ | 348/53 |
| 2009/0268935 | A1 | * | 10/2009 | Dillinger ....................... | 381/371 |

FOREIGN PATENT DOCUMENTS

| | | | |
|---|---|---|---|
| CN | 2262784 Y | * | 9/1997 |
| EP | 1 233 616 A1 | | 8/2002 |
| JP | A-61-290899 | | 12/1986 |
| JP | A-2006-148405 | | 6/2006 |
| WO | WO 01/37558 A1 | | 5/2001 |
| WO | WO 2004/061519 A1 | | 7/2004 |

* cited by examiner

OTHER PUBLICATIONS

Chinese Office Action issued in Chinese Patent Application No. 200780021980.1 by the Chinese Patent Office on Mar. 25, 2010. (with English-language translation).

*Primary Examiner* — Lun-Yi Lao
*Assistant Examiner* — Kelly B Hegarty
(74) *Attorney, Agent, or Firm* — Oliff & Berridge, PLC

(57) ABSTRACT

A headphone (3) has LEDs indicating whether a head-mounted display is used for the left eye or for the right eye. In the case shown in the attached figure, the LED of L showing that the display is used for the left eye is lit. Whether the head-mounted display is used for the left eye or for the right eye is indicated by the LEDs, and depending on whether it is used for the left eye or for the right eye, audio outputted from the headphone (3) is switched over between the left and the right. Independent of whether the head-mounted display is used for the left eye or for the right eye, audio for the right ear is outputted for the right ear and audio for the left ear is outputted for the left ear.

8 Claims, 6 Drawing Sheets

DURING RIGHT-EYE SETTING

DURING LEFT-EYE SETTING

HEAD-MOUNTED DISPLAY

TECHNICAL FIELD

The present invention relates to a head-mounted display.

BACKGROUND ART

Recently there have been various glasses-type video display devices in which video displayed on a display device such as a Liquid Crystal Display (LCD) is observed as a virtual image enlarged through an optical system having an eyepiece, a half mirror, or the like. The glasses-type video display devices are called a head-mounted display. For example, WO2004/061519A1 (Patent Document 1) discloses a head-mounted display.

Many video display devices are configured in such a way that they are worn on a face while wrapped around a head. Video display devices are mainly divided into a binocular type in which the video display system is formed at positions corresponding to the eyes and a monocular type in which the video display system is formed at a position corresponding to one of the right and right eyes. Usually the head-mounted display includes a display unit which displays video and a headphone which supplies a sound.

Some of the monocular head-mounted displays can be used while switched between right-eye use and left-eye use. Frequently the right and the left sides of the head-mounted display are interchanged with each other when it is worn on the head depending on whether the head-mounted display is used for the right eye or the left eye. In such cases, the case in which the head-mounted display is used for the right eye differs from the case in which the head-mounted display is used for the left eye in that the right and the left headphones are reversed. Accordingly, it is necessary to reverse right and left audio outputs supplied to the headphones.

In such head-mounted displays, usually it is assumed that sounds supplied from the headphones are heard while video displayed on the display unit is watched. In such cases, the headphone for the right ear and the headphone for the left ear can be distinguished by themselves.

However, depending on usage of the head-mounted display, sometimes the head-mounted display is used to listen to an audio signal alone. In such cases, the video display unit is not located in front of the eye, but sometimes the video display unit is located at a head vertex portion which is of a retracted position far away from the eye. Accordingly, there has been a problem that the right and left switching state of the headphones cannot be recognized only when a shape of the head-mounted display is seen.

In view of the foregoing, a problem to be solved by the present invention is to provide a head-mounted display with which it can be easily determined whether the head-mounted display is used for the left eye or the right eye.

DISCLOSURE OF THE INVENTION

In order to solve the problem, a first aspect according to the present invention is a monocular head-mounted display including: a display unit which displays video; a wearing unit which includes a pair of headphones and a connection unit, the pair of headphones supplying a sound, the connection unit connecting the pair of headphones; and a support unit which is attached while being turnable with respect to one of the headphones, the display unit being attached at a leading end of the support unit. The support unit can be turned in a direction of a head vertex portion in a wearing state with respect to one side of the wearing unit used to wear the head-mounted display, in which the display unit is supported by the support unit while the headphones are connected by the connection unit, on the head, and the head-mounted display can be used while switched between right-eye use and left-eye use by turning the support unit and by interchanging the right and left headphones with each other. The head-mounted display has an indicating device indicating whether the head-mounted display is used for the right eye or the left eye.

In order to solve the problem, a second aspect according to the present invention is the head-mounted display of the first aspect, wherein the head-mounted display has a function of interchanging right and left audio outputs to the headphone according to a positional relationship between the connection unit and the support unit.

In order to solve the problem, a third aspect according to the present invention is the head-mounted display of the second aspect, wherein when positions of the connection unit and the support unit are matched with each other, or when the connection unit and the support unit are brought close to each other within a predetermined range, right and left audio outputs of the headphone are delivered according to a usage state immediately before the matched state or the close state, the usage state showing right eye use or left eye use and being stored and retained.

Accordingly, the present invention can provide the head-mounted display with which it can be easily determined whether the head-mounted display is used for the left eye or the right eye.

BEST MODE FOR CARRYING OUT THE INVENTION

Figure 1:
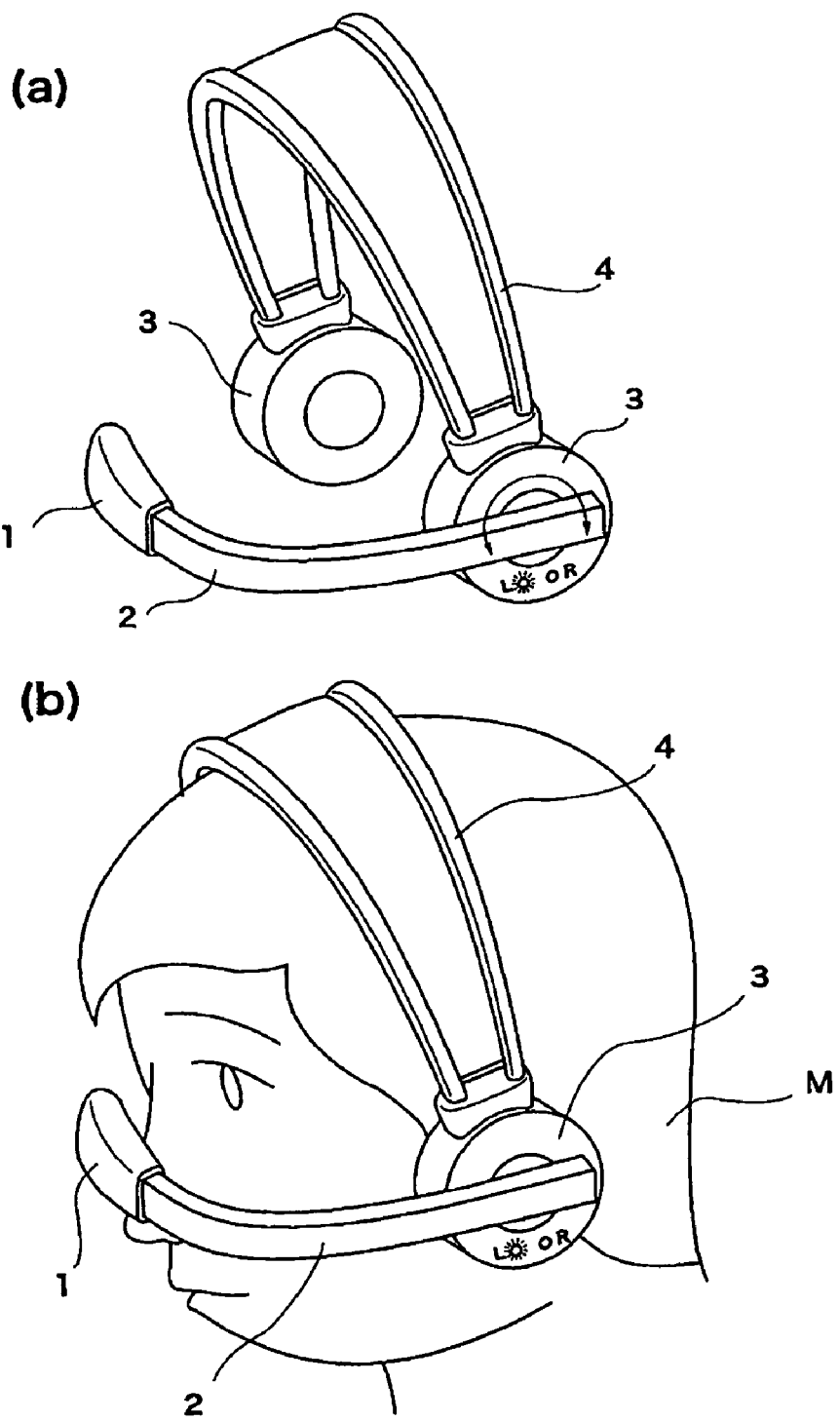
FIG. 1 is a view showing a state in which a head-mounted display according to an embodiment of the present invention is used for the left eye.

An exemplary embodiment of the present invention will be described below with reference to the drawings. FIG. 1 is a view showing a state in which a head-mounted display according to an embodiment of the present invention is used for the left eye. FIG. 1(*a*) is a view showing the head-mounted display before the head-mounted display is worn on the head. In FIG. 1(*a*), a display unit 1 which displays video is attached to a leading end of a support unit 2, and the support unit 2 is attached so as to be turnable in the direction shown by the arrow (turn amount of 180°+adjustment margin) with respect to one of headphones 3. The headphones 3 are connected by a connection unit 4.

FIG. 1(b) is a view showing a state in which the head-mounted display is worn on the head. The head-mounted display is worn in such a manner that the connection unit 4 is put on from a head vertex portion, and the two headphones 3 are held to ears. A length of the connection unit 4 is adjustable, and the resilient connection unit 4 has a function of pressing and fixing the two headphones 3 to the ears. That is, in the example of FIG. 1, the headphones 3 and the connection unit 4 constitute a wearing unit used to wear the head-mounted display on the head. Then, the support unit 2 is turned to locate the display unit 1 in front of the left eye. The support unit 2 is stretchable in order to adjust a distance between the display unit 1 and the eye.

LED is provided in one of the headphones 3 to indicate whether the head-mounted display is used for the right eye or the left eye. In FIG. 1, LED of L indicating that the head-mounted display is used for the left eye is lit on. For example, as described later, whether the head-mounted display is used for the right eye or the left eye can be detected by a position to which the support unit 2 is turned with respect to the headphone 3. (It is assumed that the head-mounted display is used for the left eye when the support unit 2 is turned with respect to the connection unit 4 as shown in FIG. 1, that is, when the support unit 2 is located on the left side of the connection unit in FIG. 1. On the other hand, it is assumed that the head-mounted display is used for the right eye when the support unit 2 is turned to the side opposite to the side shown in FIG. 1, that is, when the support unit 2 is located on the right side of the connection unit 4 in FIG. 1).

In the embodiment, whether the head-mounted display is used for the right eye or the left eye is indicated by LED, and the right and left sounds supplied from the headphones 3 are switched based on whether the head-mounted display is used for the right eye or the left eye. Therefore, the sound for right ear and the sound for left ear are supplied to the right and left ears, respectively when the headphones 3 are used for both right and left eyes.

Figure 2:
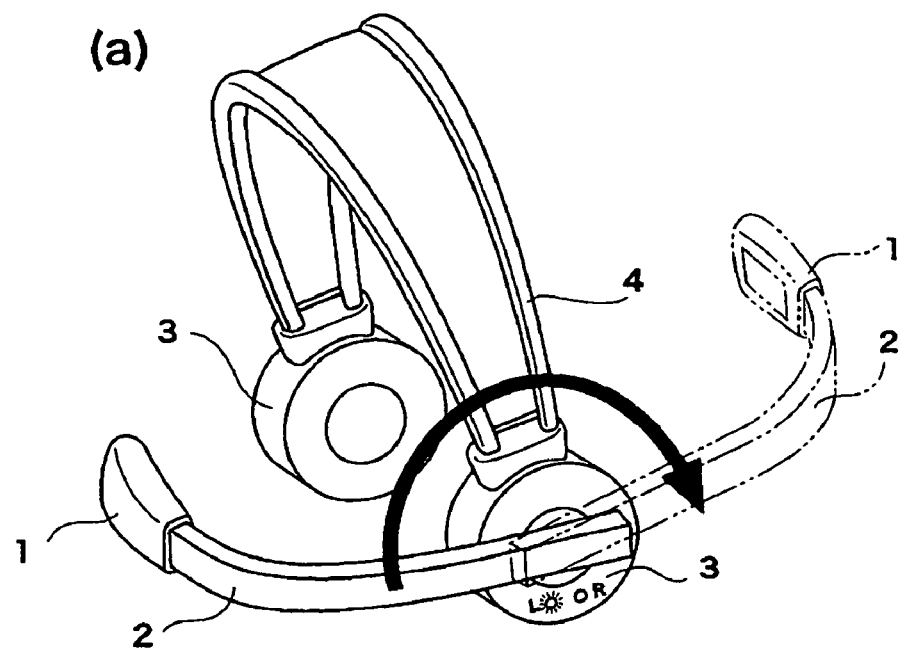
FIG. 2 is a view showing a state in which a head-mounted display for the left eye is changed to a head-mounted display for the right eye.
Figure 2:
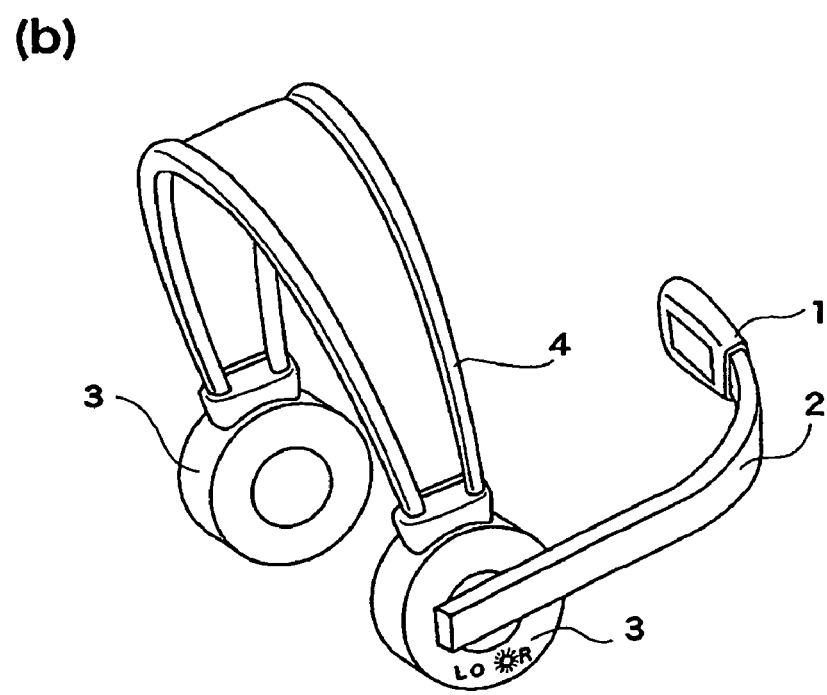

FIG. 2 is a view showing the state in which the head-mounted display for the left eye is changed to the head-mounted display for the right eye. In the following drawings, the same component as that of FIG. 1 is designated by the same numeral, and the description will be omitted. As shown in FIG. 2(a), the support unit 2 is turned about the headphone 3 by about 180 degrees to put the headphone 3 into the state shown in FIG. 2(b), thereby realizing the headphone for the right eye. However, audio outputs for the right and left ears should be interchanged with each other. The adjustment of the displayed image (vertical and horizontal image inversions) is also required, because the image displayed on the display unit 1 should be vertically and horizontally inverted with respect to the image for the left eye. Whereas LED of L indicating that the headphone 3 is used for the left eye is lit on in the state of FIG. 2(a), the LED of R indicating that the headphone 3 is used for the right eye is lit on in the state of FIG. 2(b).

Figure 3:
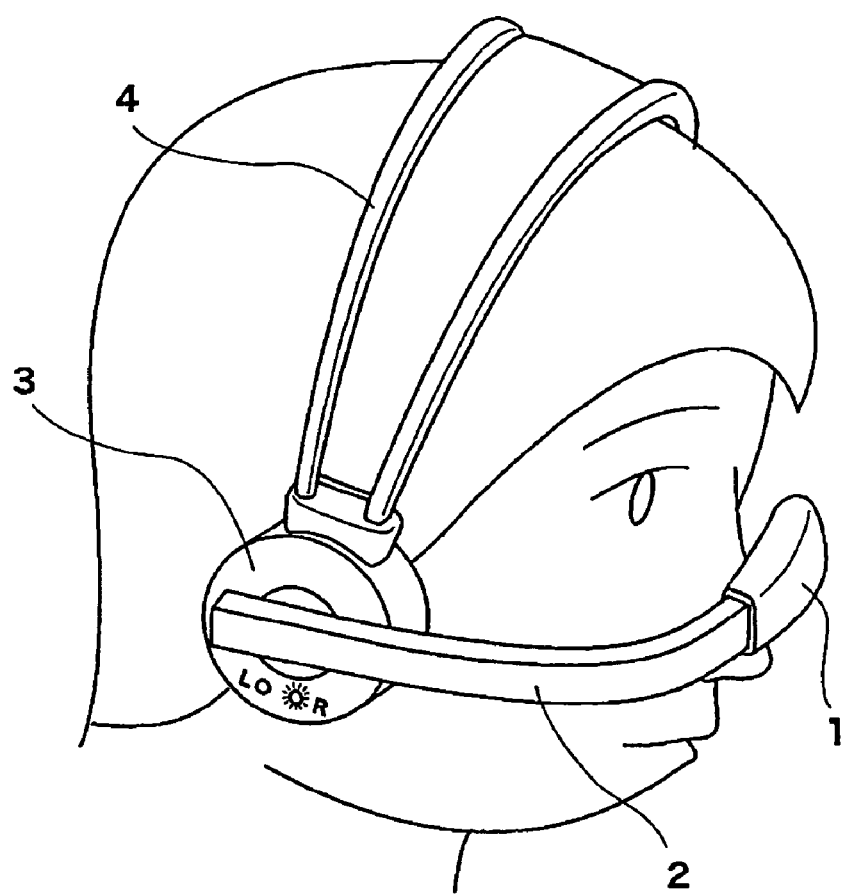
FIG. 3 is a view showing a state in which the head-mounted display shown in FIG. 1 is used for the right eye.

FIG. 3 is a view showing the state in which the head-mounted display is used for the right eye.

Figure 4:
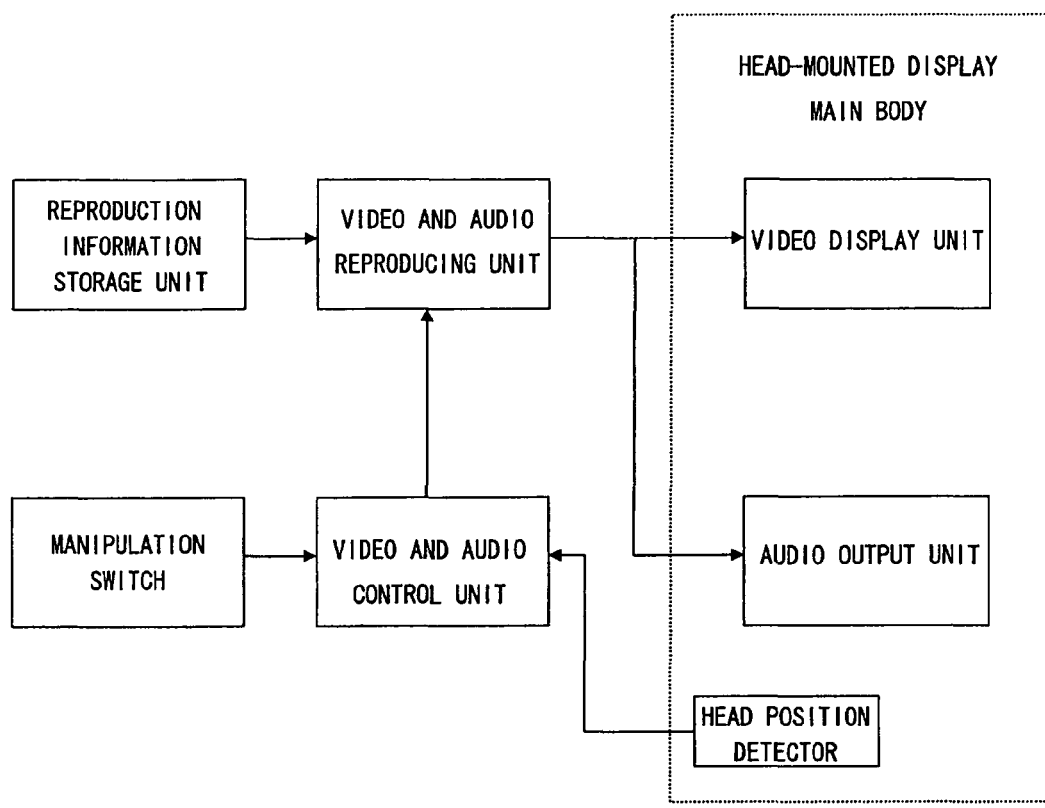
FIG. 4 is a block diagram showing an outline of control circuit of a head-mounted display according to an embodiment of the present invention.

FIG. 4 is a block diagram showing an outline of control circuit of the head-mounted display. Video information and audio information to be reproduced are stored in a reproduction information storage unit. The video information and audio information are reproduced by a video and audio reproducing unit, and the reproduced video information and audio information are supplied to a video display unit and an audio output unit (headphones) of a head-mounted display main body.

A manipulation switch is a selector switch which is used for power-on and off, a display content change, a temporary pause of the display, and the like, and a video and audio control unit performs a predetermined operation in response to the manipulation.

The video and audio control unit turns on and off the power in response to power-on and off signals supplied from the manipulation switch, and the video and audio control unit performs the display content change and the temporary pause of the display.

In the embodiment, a head position detector is attached to the head-mounted display main body. For example, a microswitch attached to the headphone 3 can be used as the head position detector. The head position detector detects the position of the support unit 2 with respect to the headphone 3, that is, whether the support unit 2 is located at the position shown in FIG. 1, at the position shown in FIG. 3, or in the direction of the head vertex portion (for example, ±15° relative to the direction of the connection unit 4 orientated toward the head vertex portion). The video and audio control unit switches the displayed video and the supplied sound between the video and audio for right eye and the video and audio for left eye using the signal supplied from the head position detector. The video and audio control unit stops displaying video on the display unit 1 when the support unit 2 is located in the direction of the head vertex portion.

Therefore, when the head-mounted display is used as simple headphones while the support unit 2 is located near the head vertex portion, the video display is stopped to eliminate supply of an unnecessary electric power.

Thus, when the support unit 2 is located in the direction of the head vertex portion (for example, ±15° relative to the direction of the connection unit 4 orientated toward the head vertex portion), sometimes which headphone supplies the sound for the right ear or the sound for the left ear cannot be recognized only by seeing the shape of the head-mounted display. However, when an indicator indicating whether the head-mounted display is used for right eye or for the left eye is provided as described above, which headphone supplies the sound for the right ear or the sound for the left ear can be recognized.

In the case where the support unit 2 is located in the direction of the head vertex portion, sometimes the detector cannot recognize whether the head-mounted display is used for the right eye or left eye due to a dead zone. In such cases, the usage state immediately before the state in which the detector cannot recognize whether the head-mounted display is used for the right eye or left eye is stored in the head-mounted display of the embodiment, and the right and left audio outputs of the headphone can be delivered according to the usage state. In such cases, the corresponding LED can be lit on to inform a user whether the head-mounted display is used for the right eye or left eye.

In the example mentioned above, the video and audio control unit has the function of switching the displayed video and the supplied sound between the right eye in use and the left eye in use using the signal supplied from the head position detector. Alternatively, a manipulation switch is separately provided, and the displayed video and the supplied sound may be switched between those used for the right eye and those used for the left eye by the manipulation switch. In such cases, when the position of the manipulation switch can be seen, the manipulation switch functions as an indicating device indicating whether the head-mounted display is used for the right eye or for the left eye.

Figure 5:
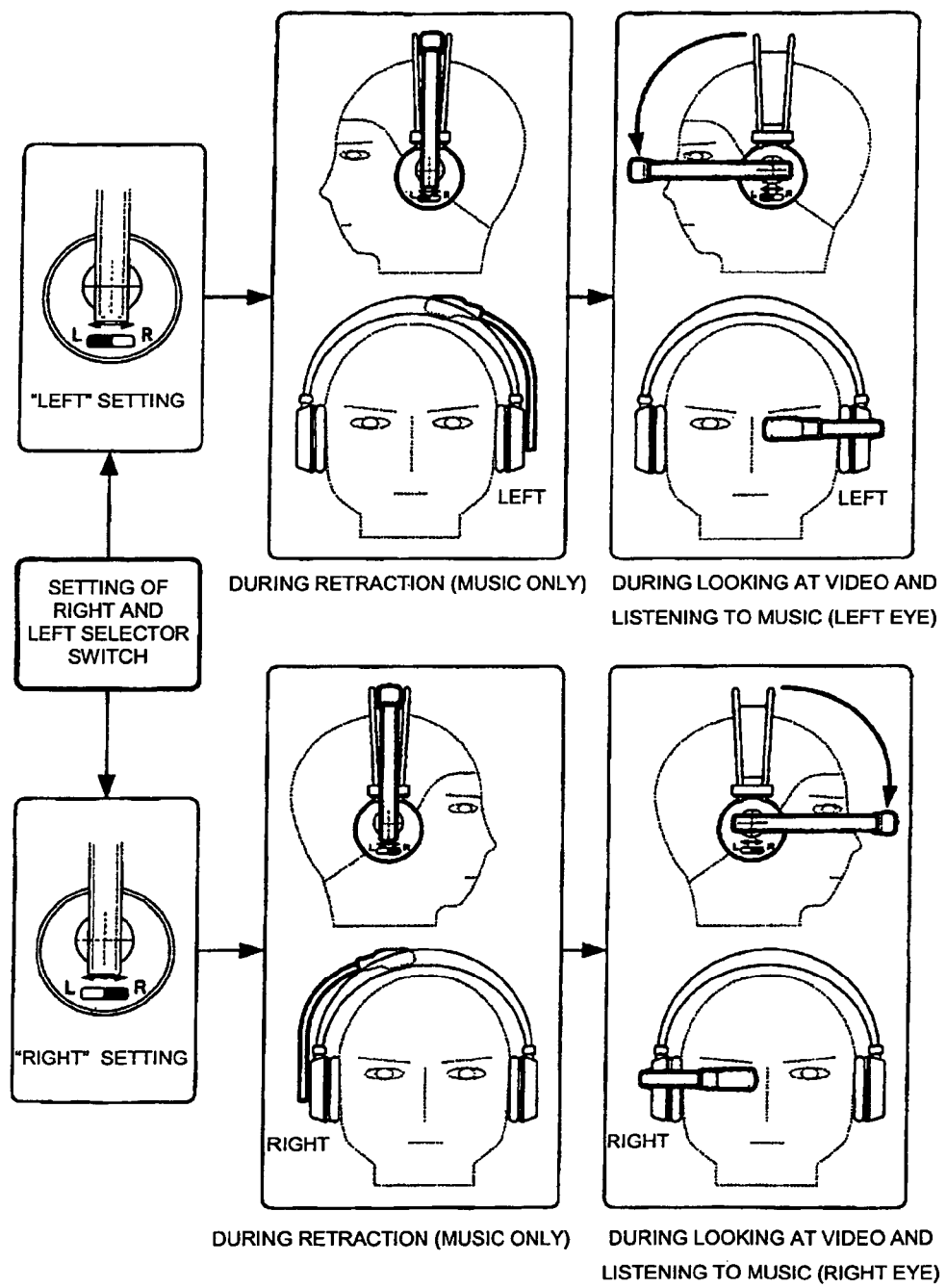
FIG. 5 is a view showing a head-mounted display according to an embodiment of the present invention and shows how to use the head-mounted display in which sounds of right and left headphones are switched.

FIG. 5 is a view showing a head-mounted display according to an embodiment of the present invention, and FIG. 5 shows how to use the head-mounted display in which the sounds of right and left headphones are switched. As described above, in the head-mounted display which is used while switched between right-eye use and left-eye use, sometimes sound for the right ear is supplied to the left ear and sound for the left ear is supplied to the right ear, when the head-mounted display in the state in which the display unit is accommodated (retracted) in the connection unit is worn on the head to listen to sounds without supplying video.

In such cases, when a selector switch is provided to switch the sounds supplied to the two headphones, the corresponding stereo sounds can correctly be supplied to the right and left ears, and the right and left of the stereo sound can be distinguished by the position of the switch. FIG. 5 shows the position and operation of the selector switch in the case of the retracted position (listening to music only) and in the case of looking at and listening to video and sound, when the head-mounted display is worn for the right eye and for the left eye.

Thus, in the monocular head-mounted display in which the right and left can be switched, it is particularly important to provide the selector switch for the right and left sounds. In such cases, whether the head-mounted display is used for the right eye or the left eye can be directory recognized by the position of the selector switch.

Figure 6:
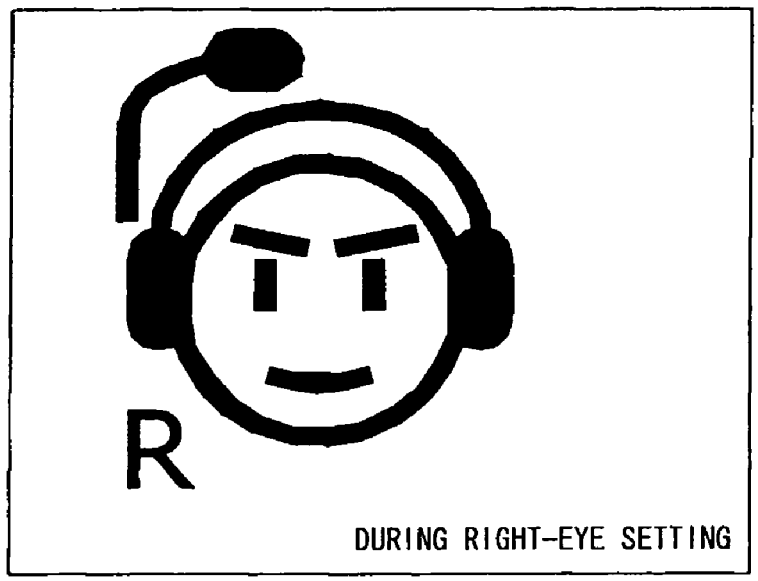
FIG. 6 is a view showing an example of a usage state of the head-mounted display, which is displayed on a manipulation unit.
Figure 6:
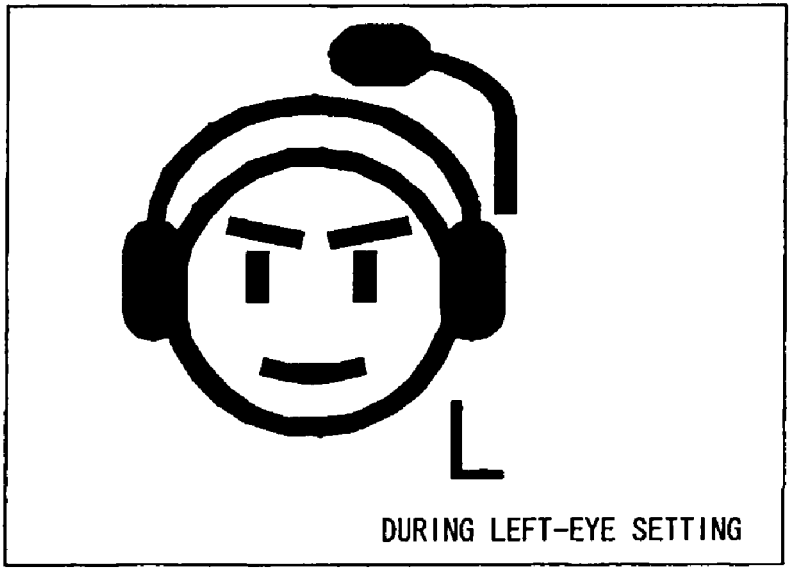

In the case where the manipulation unit is provided independently of the head-mounted display main body worn on the head, for example, an image shown in FIG. 6 (for example, liquid crystal display) can be displayed on the manipulation unit, to show the head-mounted display is used for the right eye or the left eye.

The invention claimed is:

1. A monocular head-mounted display comprising:
a display unit which displays video;
a wearing unit which includes a pair of headphones and a connection unit, the pair of headphones supplying a sound, the connection unit connecting the pair of headphones; and
a support unit which is attached while being turnable with respect to one of the headphones, the display unit being attached at a leading end of the support unit, and
a position detector,
wherein the support unit can be turned in a direction of a head vertex portion in a wearing state with respect to one side of the wearing unit used to wear the head-mounted display, in which the display unit is supported by the support unit while the headphones are connected by the connection unit, on the head, and the head-mounted display can be used while switched between right-eye use and left-eye use by turning the support unit and by interchanging the right and left headphones with each other, and wherein the position detector detects a position of the support unit with respect to said one of the headphones and the head-mounted display has an indicating device which is provided on said one of the headphones to indicate whether the head-mounted display is used for the right eye or the left eye based on an output of the position detector.

2. The head-mounted display according to claim 1, wherein the head-mounted display has a function of interchanging right and left audio outputs to the headphones according to a positional relationship between the connection unit and the support unit.

3. The head-mounted display according to claim 2, wherein when positions of the connection unit and the support unit are matched with each other, or when the connection unit and the support unit are brought close to each other within a predetermined range, right and left audio outputs of the headphone are delivered according to a usage state immediately before the matched state or the close state, the usage state showing right eye use or left eye use and being stored and retained.

4. A head-mounted display comprising:
a wearing unit which includes a pair of headphones and a connection unit, the pair of headphones supplying a sound, the connection unit connecting the pair of headphones;
a support unit to which a display unit is attached at a leading end thereof, the support unit being turnably attached to the wearing unit;
a position detector which detects a position of the support unit with respect to the wearing unit; and
an indicating device which is provided on one of the pair of headphones to indicate whether the head-mounted display is used for the right eye or the left eye based on an output of the position detector.

5. The head-mounted display according to claim 4, wherein the head-mounted display has a function of interchanging right and left audio outputs to the headphones according to a positional relationship between the connection unit and the support unit.

6. The head-mounted display according to claim 5, wherein when positions of the connection unit and the support unit are matched with each other, or when the connection unit and the support unit are brought close to each other within a predetermined range, right and left audio outputs of the headphone are delivered according to a usage state immediately before the matched state or the close state, the usage state showing right eye use or left eye use and being stored and retained.

7. A head-mounted display comprising:
a wearing unit which includes a pair of headphones and a connection unit, the pair of headphones supplying a sound, the connection unit connecting the pair of headphones;
a support unit to which a display unit is attached at a leading end thereof, the support unit being turnably attached to the wearing unit;
a position detector which detects a position of the support unit with respect to the wearing unit; and
an indicating device which is provided on one of the pair of headphones to indicate whether at least one of the headphones is to be used for the right ear or the left ear based on an output of the position detector.

8. A head-mounted display comprising:
a wearing unit which includes a pair of headphones and a connection unit, the pair of headphones supplying a sound and the connection unit connecting the pair of headphones;
a support unit to which a display unit is attached at a leading end thereof, the support unit being turnably attached to the wearing unit;
a switch for vertical and horizontal image inversion of the display unit; and
an indicating device which is provided on one of the pair of headphones to indicate whether at least one of the headphones is to be used for the right ear or the left ear, the indicating device being connected with the switch.

* * * * *

UNITED STATES PATENT AND TRADEMARK OFFICE
CERTIFICATE OF CORRECTION

| | |
|---|---|
| PATENT NO. | : 8,362,972 B2 |
| APPLICATION NO. | : 12/292145 |
| DATED | : January 29, 2013 |
| INVENTOR(S) | : Miyakawa et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 842 days.

Signed and Sealed this
Eighteenth Day of November, 2014

Michelle K. Lee
*Deputy Director of the United States Patent and Trademark Office*